(12) United States Patent
Yen et al.

(10) Patent No.: US 7,305,131 B2
(45) Date of Patent: Dec. 4, 2007

(54) EXTRACTING GRAPHICAL BAR CODES FROM AN INPUT IMAGE

(75) Inventors: Jonathan Yen, San Jose, CA (US); Huitao Luo, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 789 days.

(21) Appl. No.: 10/262,434

(22) Filed: Oct. 1, 2002

(65) Prior Publication Data

US 2004/0062443 A1    Apr. 1, 2004

(51) Int. Cl.
*G06K 9/68* (2006.01)
*G06K 5/04* (2006.01)

(52) U.S. Cl. .................... 382/218; 235/462.08

(58) Field of Classification Search ........... 235/462.08–462.09; 382/292–296, 218
See application file for complete search history.

(56) References Cited

U.S. PATENT DOCUMENTS

| | | | |
|---|---|---|---|
| 4,736,437 A * | 4/1988 | Sacks et al. ................ | 382/216 |
| 5,073,954 A * | 12/1991 | Van Tyne et al. ....... | 235/462.08 |
| 5,134,661 A | 7/1992 | Reinsch | |
| 5,323,472 A * | 6/1994 | Falk ............................ | 382/103 |
| 5,371,690 A * | 12/1994 | Engel et al. ................ | 382/151 |
| 5,406,642 A * | 4/1995 | Maruya ....................... | 382/218 |
| 5,613,013 A * | 3/1997 | Schuette .................... | 382/124 |
| 5,694,484 A | 12/1997 | Cottrell et al. | |
| 6,031,539 A * | 2/2000 | Kang et al. ................. | 345/419 |
| 6,094,499 A * | 7/2000 | Nakajima et al. .......... | 382/124 |
| 6,201,901 B1* | 3/2001 | Zhou et al. ................. | 382/306 |
| 6,389,182 B1* | 5/2002 | Ihara et al. ................. | 382/309 |
| 6,837,432 B2* | 1/2005 | Tsikos et al. ........... | 235/462.01 |
| 2002/0006233 A1* | 1/2002 | Adachi et al. ............. | 382/289 |
| 2002/0063905 A1 | 5/2002 | Hsu et al. | |
| 2002/0074405 A1* | 6/2002 | Hadano et al. ........ | 235/462.08 |
| 2002/0095439 A1 | 7/2002 | Long et al. | |
| 2002/0126915 A1* | 9/2002 | Lai et al. ..................... | 382/296 |
| 2003/0174891 A1* | 9/2003 | Wenzel et al. .............. | 382/209 |

OTHER PUBLICATIONS

G.K. Matsopoulos, N.A. Mouravliansky, K.K. Delibasis, and K.S. Nikita, "Automatic Retinal Image Registration Scheme Using Global Optimization Techniques," IEEE Trans. Information Technology in Biomedicine, vol. 3, No. 1, pp. 47-60, 1999.*

J.A. Nelder et al., "A sinplex method for function minimization," Computer Journal, vol. 7, pp. 308-313 (1965).

* cited by examiner

*Primary Examiner*—Bhavesh M Mehta
*Assistant Examiner*—Hadi Akhavannik (57) ABSTRACT

Systems and methods for extracting a graphical bar code (i.e., an image that contains inconspicuous graphical modulations that encode embedded information) from an input image are described. In one aspect, estimates of position coordinates for a detected graphical bar code candidate are computed. An objective function is optimized based on the computed position coordinates to obtain final position coordinate estimates for the graphical bar code candidate. Non-graphical bar code regions are trimmed from the input image based on the final position coordinates for the graphical bar code candidate to produce a trimmed graphical bar code candidate for decoding.

24 Claims, 8 Drawing Sheets

EXTRACTING GRAPHICAL BAR CODES FROM AN INPUT IMAGE

CROSS-REFERENCE TO RELATED APPLICATIONS

This application relates to the following co-pending applications, each of which is incorporated herein by reference: U.S. patent application Ser. No. 09/579,070, filed May 25, 2000, by Doron Shaked et al., and entitled "A Method and Apparatus for Generating and Decoding a Visually Significant Bar Code;" U.S. patent application Ser. No. 09/429,515, filed Oct. 28, 1999 by Renato Keshet et al., and entitled "System and Method for Counterfeit Protection;" U.S. Ser. No. 09/728,292, filed Dec. 1, 2000, by Jonathan Yen et al., and entitled "Authenticable Graphical Bar Codes;" U.S. Ser. No. 09/877,516, filed on Jun. 7, 2001, by Doron Shaked et al., and entitled "Generating and Decoding Graphical Bar Codes;" and U.S. patent application Ser. No. 09/877,581, filed on Jun. 7, 2001, and entitled "Automatically Extracting Graphical Bar Codes."

TECHNICAL FIELD

This invention relates to systems and methods for extracting graphical bar codes.

BACKGROUND

A typical bar code symbol is a pattern of parallel bars and spaces of various widths that represent data elements or characters. The bars represent strings of binary ones and the spaces represent strings of binary zeros. A conventional "one-dimensional" bar code symbol contains a series of bars and spaces that vary only in a single dimension. One-dimensional bar code symbols have relatively small information storage capacities. "Two-dimensional" bar codes have been developed to meet the increasing need for machine-readable symbols that contain more information than one-dimensional bar code symbols. The information storage capacity of two-dimensional bar code symbols is increased relative to one-dimensional bar codes by varying the bar code patterns in two dimensions. Common two-dimensional bar code standards include PDF417, Code 1, and Maxicode. One-dimensional and two-dimensional bar code symbols typically are read by optical scanning techniques (e.g., by mechanically scanned laser beams or by self-scanning charge-coupled devices (CCD's)) that convert a printed bar code symbol into electrical signals. The electrical signals are digitized and decoded to recover the data encoded in the printed bar code symbol.

Bar codes may be used in a variety of applications, including low information content applications (e.g., automatic price tagging and inventory management), and relatively high information content applications (e.g., encoding mail addresses and postage for automated mail reading and mail distribution systems, and encoding compressed content of a printed page).

SUMMARY

The invention features a scheme (systems and methods) for extracting a graphical bar code from an input image. In accordance with this inventive scheme, estimates of position coordinates for a detected graphical bar code candidate are computed. An objective function is optimized based on the computed position coordinates to obtain final position coordinate estimates for the graphical bar code candidate. Non-graphical bar code regions are trimmed from the input image based on the final position coordinates for the graphical bar code candidate to produce a trimmed graphical bar code candidate for decoding.

As used herein, the term "graphical bar code" broadly refers to an image that contains inconspicuous graphical modulations that encode embedded information.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
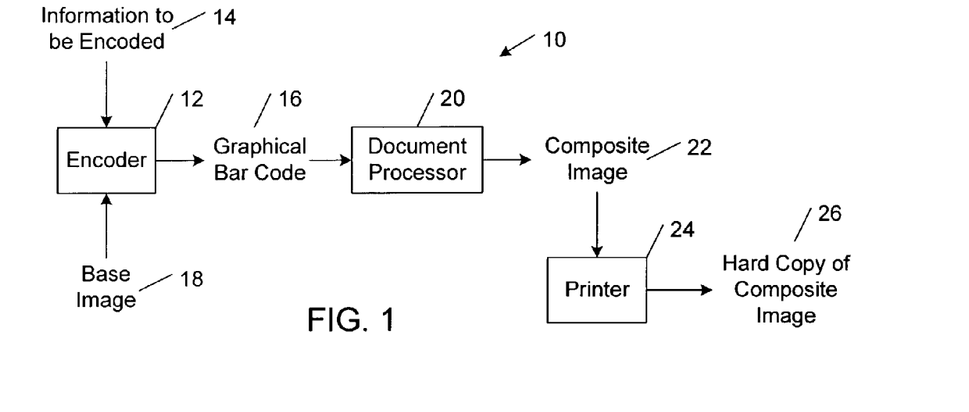
FIG. 1 is a block diagram of a system for incorporating into a composite image a graphical bar code containing encoded information and for printing a hard copy of the composite image.

Referring to FIG. 1, in one embodiment, a system 10 for incorporating a graphical bar code into a composite image includes an encoder 12 that is configured to encode information 14 into a graphical bar code 16. Encoder 12 may be implemented as one or more program modules that are executable on a computer or other programmable processor. As explained in detail below, encoder 12 modulates a base image 18 with a graphical encoding of information 14 to produce graphical bar code 16. Base image 18 may be any graphical pattern, including a logo (e.g., a company logo), graphics, pictures, text, images, or any pattern that has visual significance. Information 14 may be embedded in the graphical design of text, pictures, images, borders, or the background of base image 18 to produce graphical bar code 16. Information 14 may be embedded in graphical bar code 16 in the form of a binary image (e.g., a black and white dot pattern), a multilevel image (e.g., a gray-level image), or a multilevel color image. System 10 also includes a document processor 20 that is configured to incorporate graphical bar code 16 into a composite image 22. Document processor 20 may be a conventional word processing application program or other document processing application program. System 10 may include a printer 24 for producing a hard copy 26 of composite image 22. Printer 24 may be a conventional printer (e.g., a LaserJet® printer available from Hewlett-Packard Company of Palo Alto, Calif., U.S.A.) or a special-purpose label printing device. Hard copy 26 may be in the form of any one of a wide variety of printed materials, including a bank draft (or check) carrying a graphical bar code of a withdrawal authorization signature, a stock certificate or bond carrying a graphical bar code of an authenticity certification, and an envelope carrying a graphical bar code of postage indicia. In other embodiments, composite image 22 may be rendered by other printing processes. For example, in some embodiments, graphical bar code 16 may be in the form of a tag that may be attached physically to a document to produce composite image 22. Composite image 22 also may be rendered in an electronic format.

In some embodiments, rather than embedding information 14 directly into base image 18, encoder 12 may be programmed to generate from information 14 a corroborative signed message, which then may be incorporated into graphical bar code 16. Such a corroborative signed message may be generated by the encoding process described in U.S. Ser. No. 09/728,292, filed Dec. 1, 2000, by Jonathan Yen et al., and entitled "Authenticable Graphical Bar Codes."

Figure 2A:
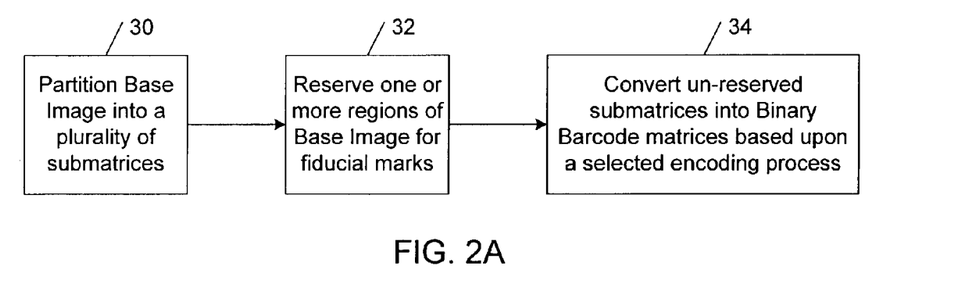
FIG. 2A is a flow diagram of a method of rendering a base image with a graphical encoding of information.
Figure 2B:
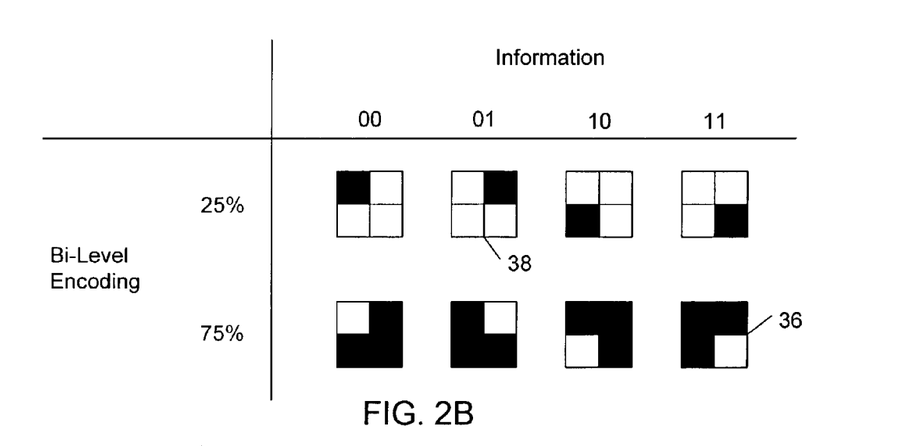
FIG. 2B is a table mapping information to a two-bit bi-level graphical code.

Referring to FIGS. 2A and 2B, graphical bar code 16 may be produced by graphically modulating base image 18 in accordance with the graphical encoding scheme described in co-pending U.S. patent application Ser. No. 09/579,070, filed May 25, 2000, by Doron Shaked et al., and entitled "A Method and Apparatus for Generating and Decoding a Visually Significant Bar code." In accordance with this graphical encoding process, base image 18 is partitioned into a plurality of sub-matrices (step 30). One or more regions of base image 18 are reserved for fiducial markings (step 32). Un-reserved sub-matrices are converted into binary bar code matrices based upon a selected graphical encoding process (step 34). For example, in one graphical encoding embodiment, information 14 may be encoded into a bi-level image by a two-bit encoding process based upon the two-by-two halftone patterns (or matrices) illustrated in FIG. 2B. In accordance with this graphical encoding process, sub-matrices in base image 18 undergo a thresholding process and a bi-level half-toning process. For example, in one embodiment, sub-matrices in base image 18 that have a gray level that is less than 50% are encoded with one of the four bar code matrices in the 25% row of FIG. 2B. Sub-matrices in base image 18 that have a gray level that is at least 50% are encoded with one of the four bar code matrices in the 75% row of FIG. 2B. In other embodiments, the encoding threshold level may be greater than or less than 50%. The particular bar code matrix used to render a sub-matrix of base image 18 is selected based upon the information to be encoded. For example, if "11" is to be encoded at a 75% gray level sub-matrix location, bar code matrix 36 is used to render that sub-matrix. Similarly, if "01" is to be encoded at a 25% gray level sub-matrix location, bar code matrix 38 is used to render that sub-matrix.

In general, the graphical encoding process of FIGS. 2A and 2B may be extended to M-bit encoding mappings, where M has an integer value of 1 or greater. For example, in one embodiment, information is encoded by a five-bit encoding process based upon three-by-three halftone patterns. In other embodiments, graphical bar code 16 may be produced by graphically modulating base image 18 in accordance with the graphical encoding scheme described in co-pending U.S. patent application Ser. No. 09/877,581, filed on Jun. 7, 2001, by Doron Shaked et al., and entitled "Generating and Decoding Graphical Bar Codes."

Figure 3:
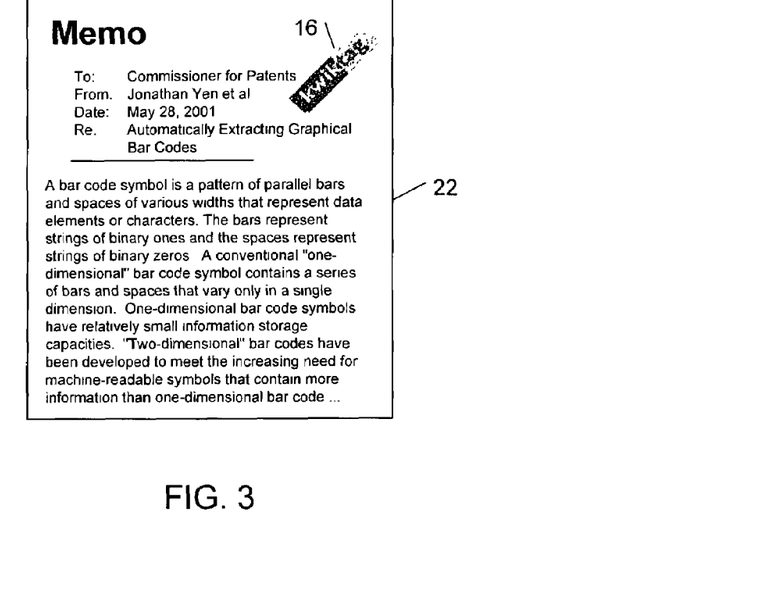
FIG. 3 is a diagrammatic view of a composite image produced by the system of FIG. 1.

Referring to FIG. 3, the resulting composite image 22 may be in the form of any one of a wide variety of images. For example, in this particular illustrative embodiment, composite image 22 is in the form of a memorandum document. Graphical bar code 16 may be incorporated into composite image 22 in any one of a wide variety of ways. For example, graphical bar code 16 may be located anywhere in composite image 22 and may be oriented at any angle. In the embodiment of FIG. 3, graphical bar code 16 is located in the upper right corner of composite image 22 and is rotated 45° counterclockwise relative to the normal (or upright) orientation of composite image 22. Graphical bar code 16 preferably is positioned in a composite image region that is free of other markings (i.e., a "white" image region); although, graphical bar code 16 advertently or inadvertently may be positioned over marked regions of composite image 22. In some embodiments, graphical bar code 16 may be incorporated into composite image 22 with a surrounding marking-free (or white) border region to improve the accuracy and robustness of the automatic extraction process described below. It is noted that the location and angular orientation of graphical bar code 16 may change during handling of hard copies 26 of composite image 22. For example, over time, one or several successive copying or scanning operations may change the location of graphical bar code 16 or the angular orientation of graphical bar code 16, or both.

In some embodiments, graphical bar code 16 may be printed onto a separate substrate or tag that may be attached to a document or other object using, for example, an adhesive to form hard copy 26 of a composite image.

Figure 4:
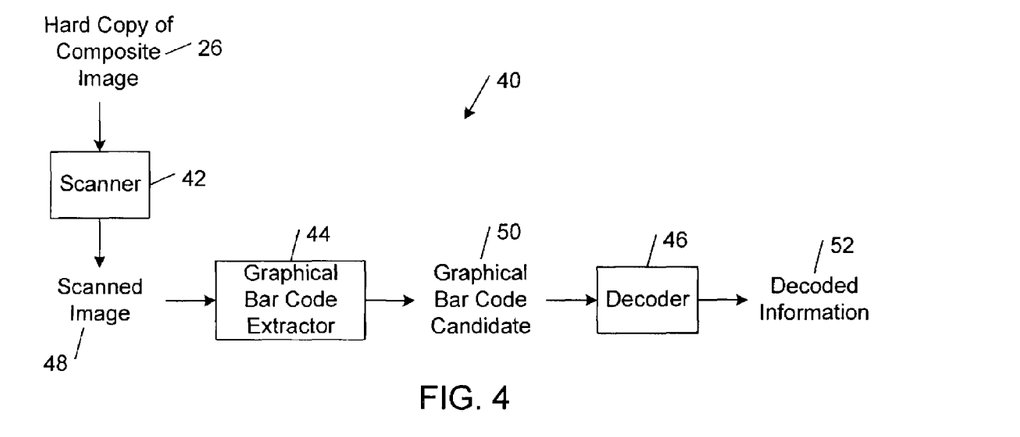
FIG. 4 is a block diagram of one embodiment of a system for automatically extracting a graphical bar code from a hard copy of a composite image and for decoding information from the extracted graphical bar code.

As shown in FIG. 4, in one embodiment, a system 40 for automatically extracting information 14 from graphical bar code 16 includes a scanner 42, a graphical bar code extractor 44, and a decoder 46. Scanner 42 may be a conventional desktop optical scanner (e.g., a ScanJet® scanner available from Hewlett-Packard Company of Palo Alto, Calif., U.S.A.), a portable scanner (e.g., a CapShare® portable scanner available from Hewlett-Packard Company of Palo Alto, Calif., U.S.A.), or a conventional facsimile machine. Graphical bar code extractor 44 and decoder 46 may be in the form of one or more program modules that are operable on a computer or other programmable processor. In operation, scanner 42 reads hard copy 26 to produce a digitized scanned image 48. Graphical bar code extractor 44 determines the location and angular orientation of one or more graphical bar code candidates 50 that are detected within scanned image 48, and extracts the graphical bar code candidates 50 from composite image 22. In some embodiments, decoder 46 extracts information 14 from graphical bar code candidates 50 based upon a comparison of graphical bar code candidates 50 and base image 18. In embodiments in which information 14 is encoded into a corroborative signed message, decoder 46 may be configured to decode the signed message to produce a decoded message 52. The resulting signed message then may be decoded using a conventional error correction code decoding process.

As explained above, the unique way in which information is encoded in graphical bar code 16 makes the decoding process particularly sensitive to noise, such as extraneous markings and image corruption. Thus, in order to extract information 14 from graphical bar code 16, graphical bar code 16 must be isolated from composite image 22 in a way that preserves the information-containing graphical modulations encoding information 14 by avoiding corruption of graphical bar code 16, for example, by markings contained in composite image 22. In addition, the extracted graphical bar code 16 may be processed into a format that is suitable for decoding. For example, in some embodiments, the graphical bar code must be trimmed and resolution-scaled before it may be processed by decoder 46.

Referring to FIGS. 5-11, in one embodiment, graphical bar code extractor 44 may extract automatically one or more graphical bar code candidates from composite image 22, as follows.

Figure 5:
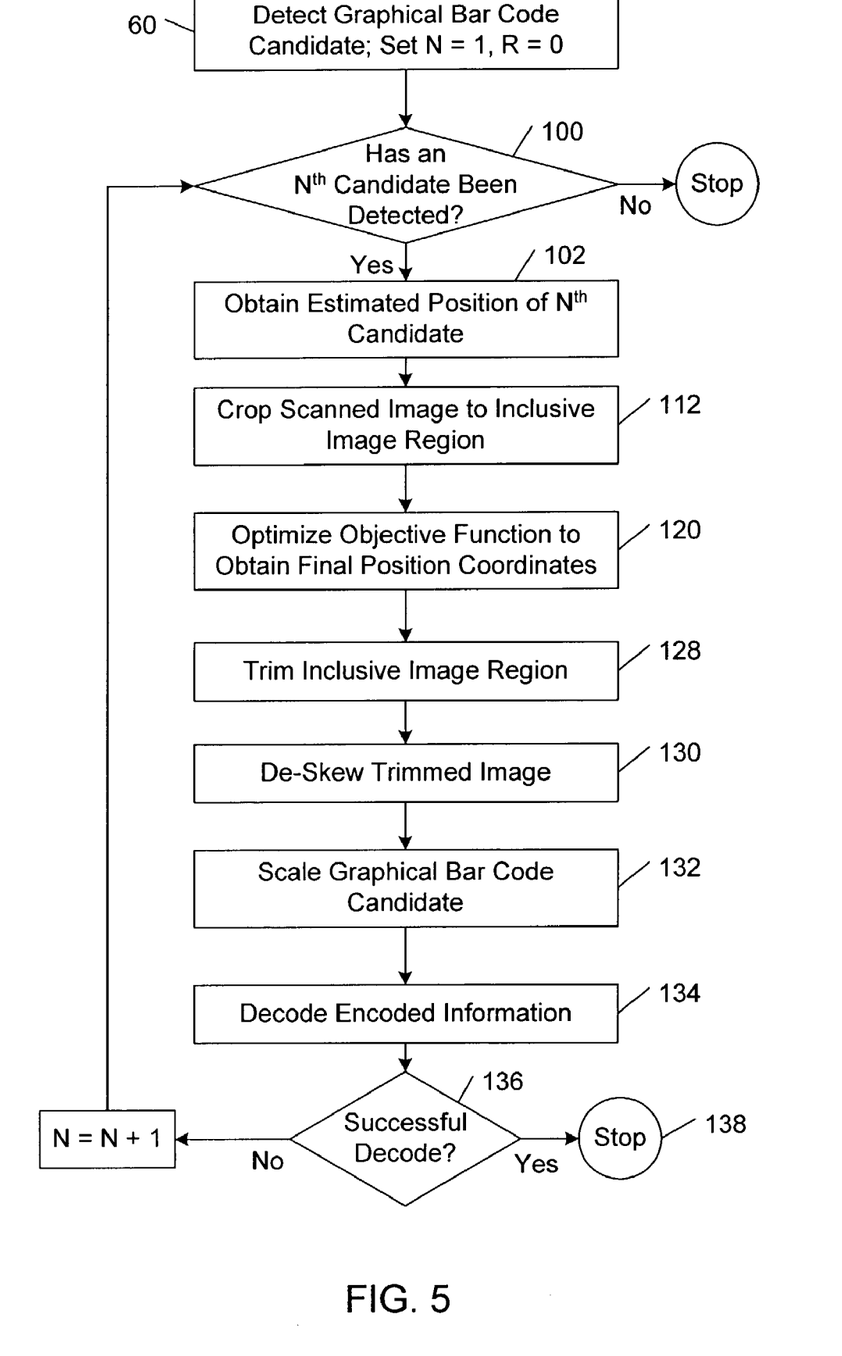
FIG. 5 is a flow diagram of one embodiment of a method of automatically extracting a graphical bar code from a composite image.
Figure 6:
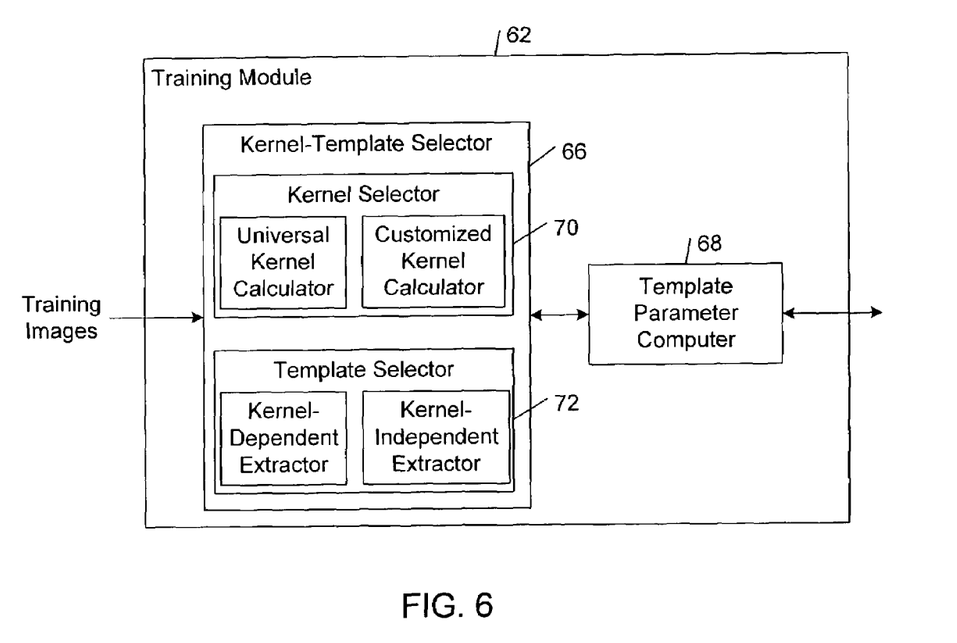
FIG. 6 is a block diagram of a training module of a graphical bar code detection system.
Figure 7:
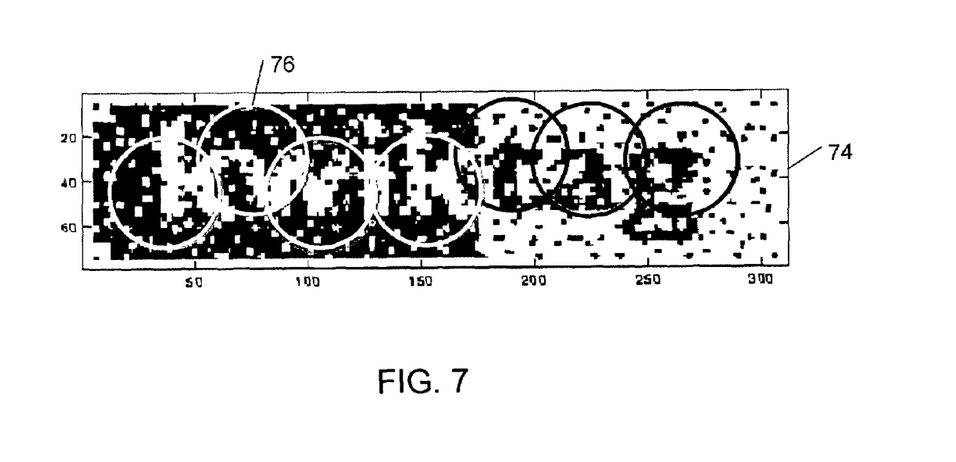
FIG. 7 is a diagrammatic view of a graphical bar code and seven overlying circles defining template regions from which a parameter file that is characteristic of the graphical bar code may be generated by the training module of FIG. 6.
Figure 8:
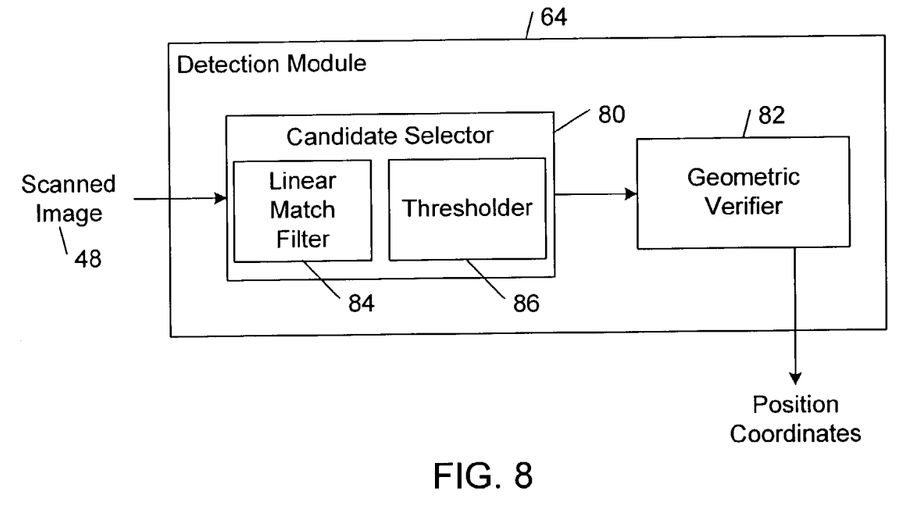
FIG. 8 is a block diagram of a detection module of a graphical bar code detection system.

Referring initially to FIGS. 5-7, graphical bar code extractor 44 first detects a graphical bar code candidate 50 in scanned image 48 (step 60; FIG. 5). In one embodiment, the detection process is implemented by the image detection system described in U.S. patent application Ser. No. 09/429, 515, filed Oct. 28, 1999 by Renato Keshet et al., and entitled "System and Method for Counterfeit Protection." The image detection system is configured to perform an off-line training procedure and an on-line detection procedure. The training procedure involves deriving from one or more training samples of graphical bar code 16 (indexed by i=0, ..., L−1) a parameter file that contains detection descriptors for graphical bar code 16. The detection procedure involves processing scanned image 48 using the parameter file to determine whether one or more regions of scanned image 48 matches graphical bar code 16. The training procedure is implemented by a training module 62 (FIG. 6), and the detection procedure is implemented by a detection module 64 (FIG. 8).

As shown in FIG. 6, training module 62 includes a kernel-template selector 66 and a template parameter computer 68. Kernel-template selector 66 includes a kernel selector 70 and a template selector 72. Kernel selector 70 is configured to select either universal kernels or customized kernels. Template selector 72 is configured to extract either kernel-dependent templates or kernel-independent templates from the graphical bar code training samples. In operation, after kernels and templates have been selected, template parameter computer 68 projects the templates onto the kernels to derive projections values that are used by template parameter computer 68 to define a number of intervals to be used by detection module 64 during the on-line detection procedure. Template parameter computer 68 stores the defined intervals in a parameter file. The parameter file also includes a number of input parameters, the coefficients of the selected kernels, and document parameters. The operation of kernel-template selector 66 may be controlled based upon the input parameters identified in Table 1 below.

TABLE 1

Input parameters for kernel-template selector.

| PARAMETER | DESCRIPTION |
| --- | --- |
| $R_0$ | Resolution of the input image |
| L | The number of templates per graphical bar code |
| N | Kernel size |
| R | Decimation rate (or sub-sampling rate) |
| $K_{ISO}$ | The number of isotropic kernels |
| $K_{NON}$ | The number of non-isotropic kernels |
| C | The number of colors |
| $S_t$ | Template selection type (kernel-independent, kernel-dependent) |
| $S_k$ | Kernel selection type (universal, customized) |
| $F_M$ | Local-maximum flag |
| $F_N$ | Normalization flag |
| $L_e$ | Number of essential templates |

As explained in U.S. patent application Ser. No: 09/429, 515, filed Oct. 28, 1999 by Renato Keshet et al., and entitled "System and Method for Counterfeit Protection," templates are circular extracts from the graphical bar code training samples. The number of templates that are used to characterize a given graphical bar code training sample may be selected during the off-line training procedure to obtain a desired tradeoff between detection speed and detection accuracy. The diameter of the templates (in pixels) is given approximately by the product NR, where N and R are the kernel size and the decimation rate, respectively. Because the values of N and R are fixed, a template is uniquely characterized by the position of its center within the graphical bar code training samples. The templates are required to be totally contained within the image, therefore the locus of their centers is an eroded version of the image domain. In particular, if the graphical bar code training samples lies in an a×b rectangle, then the center locus is a concentric (a−NR)×(b−NR) rectangle. This center locus is denoted herein as a "search window." For practical reasons, the search window may be defined as a concentric (a−√2NR)×(b−√2NR) rectangle. This allows rotated versions of templates to be computed.

The kernels are N×N pixel images that are used for linear convolution with an input image (e.g., scanned image 48) that is to be examined during the on-line procedure, to determine whether the input image contains a duplicate of a graphical bar code training samples. The results of such convolutions are analyzed by the detection module during the on-line image detection procedure. In the illustrated embodiment, each kernel is circular in shape. There are two types of kernels: isotropic and non-isotropic. The numbers of isotropic and non-isotropic kernels are determined by the input parameters $K_{ISO}$ and $K_{NON}$, respectively. Ideally, the isotropic kernels are 2D real functions that do not depend on the orientation angle (e.g., they are composed of concentric rings). Since sampled functions are utilized to derive the kernels, as explained in U.S. patent application Ser. No. 09/429,515, filed Oct. 28, 1999 by Renato Keshet et al., and entitled "System and Method for Counterfeit Protection," the isotropic kernels are considered to be an approximation of the above-explained ideal concept. The main desired property of these isotropic kernels is that when projecting (by means of inner product) all rotated versions of a given circular image on an isotropic kernel, the result is constant (i.e., does not depend on the rotation angle). Non-isotropic kernels are complex kernels satisfying the following properties: (a) the absolute value of the inner product between the non-isotropic kernel and a rotated version of a given circular image does not depend on the rotation angle; and (b) the phase of the above inner product is equal to a multiple of the rotation angle plus a constant.

As shown in FIG. 7, in one particular illustrative embodiment, seven templates 76 (corresponding to the image portions located within the black and white circles) are selected for a graphical bar code training samples 74. In this embodiment, the following additional input parameters are selected: two isotropic kernels; two non-isotropic kernels; 64 rotational increments; a 4× sub-sampling rate (i.e., R=4); and a kernel size of 9×9 pixels (i.e., N=9). After processing by training module 62, graphical bar code candidates corresponding to graphical bar code training samples 74 may be detected by detection module 64 based upon the parameter file generated by training module 62.

Referring to FIG. 8, in one embodiment, detection module 64 includes a candidate selector 80 and a geometric verifier 82. Candidate selector 80 is configured to receive an input image (e.g., scanned image 48) and the parameter file during an on-line detection procedure. The candidate selector 80 includes a linear match filter 84 and a thresholder 86. The linear match filter 84 is designed to project portions of the input image onto the kernels that were selected during the off-line training procedure. The resulting projection values then are compared by thresholder 86 using the intervals defined in the parameter file. Portions of the input image that satisfy the comparison for all intervals are declared template match candidates. Coordinates of these template match candidates are transmitted to the geometric verifier 82. The geometric verifier 82 is configured to geometrically compare the template match candidates with the templates of the graphical bar code training samples 74 using predefined criteria to determine whether the input image is a duplicate of the graphical bar code training samples. If the predefined criteria are satisfied, the input image is determined to be a duplicate (or a match) of the graphical bar code training samples.

Figure 9:
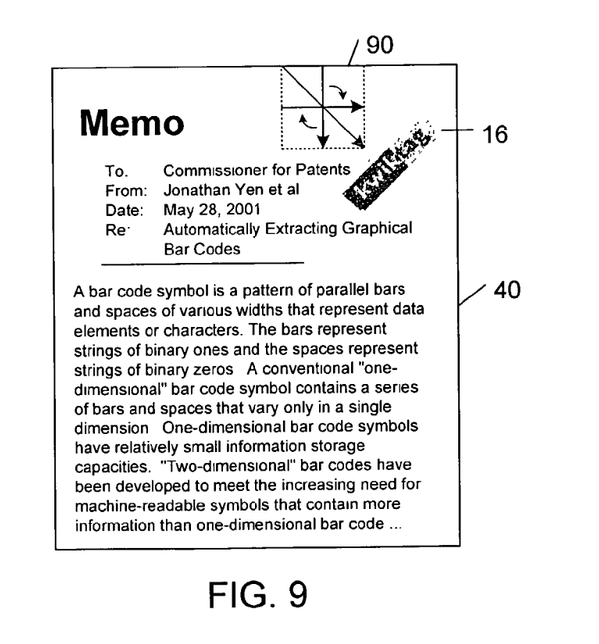
FIG. 9 is a diagrammatic view of the composite image of FIG. 3 and a kernel region that is processed along multiple rotational directions.

As shown in FIG. 9, in operation, for each position (m, n) within scanned image 48, candidate selector 80 checks an N×N block 90 centered at (m, n) to determine whether that block is a template match candidate. In particular, for each of the preselected scan angles, the color planes (indexed by c) of the block 90 are projected (by inner product) on the isotropic and non-isotropic kernels (indexed by k) by linear match filter 84 of candidate selector 80, resulting in the projection values v[k] [c] (m, n). These values then are compared with the interval thresholds by thresholder 86 for each of the templates ($\tau$=0, 1, . . . , L−1) that are contained in the parameter file. Among the tests that may be performed based upon the parameter file are: a color interval check; an intensity interval check; and a check whether the block corresponds to a local maximum of the energy function e:

$$e(m, n) = \sum_c \sum_k |v[k][c](m, n)|^2$$

If the block passes all of the above tests for a certain set of parameters, the block is considered to be a template match, in which case the block orientation interval $\Delta\gamma$ is estimated and the match parameters i, $\tau$, m, n, and $\Delta\gamma$ are added to a match list that is passed to the geometric verifier 82.

In order to improve the detection speed of the detection module, the interval checks are performed in a pipelined way. For example, the color check for a kernel k is performed only if the color check for the previous kernel k−1 has passed. The intensity check is performed in the same pipelined manner only if the block passed all of the color checks. Finally, the local-maximum test is performed only if the block passed all of the previous tests.

Geometric verifier 82 verifies the template matches identified by candidate selector 80. In particular, geometric verifier 82 looks for combinations of $L_e$ (i.e., the specified number of essential templates) template candidates in the match list that satisfy the following requirements:

All of the $L_e$ candidates correspond to the same graphical bar code training samples 74;

The $L_e$ candidates have different templates numbers $\tau$, and the first two templates ($\tau$=0 and $\tau$=1) are present;

The distance between the first two templates (i.e., the position of each given by m, n) should match approximately that given in the parameter file; and The document coordinates of the templates with $\tau \geq 2$ should match those given in the parameter file;

If a set of $L_e$ candidates in the match list satisfies the above requirements, then this set is declared to be a match by geometric verifier 82.

Further details regarding the operation and implementation of the detection system, including training module 62 and detection module 64, may be obtained from U.S. patent application Ser. No. 09/429,515, filed Oct. 28, 1999 by Renato Keshet et al., and entitled "System and Method for Counterfeit Protection."

Referring back to FIG. 5, if one or more graphical bar code candidate matches have been detected (step 100), the geometric verifier 82 passes to another program module of graphical bar code extractor 44 estimates of position coordinates for a pair of diagonal corners of the first detected graphical bar code candidate (step 102). From this information, graphical bar code extractor 44 may determine the orientation angle of the detected graphical bar code candidate and the position coordinates of the remaining pair of diagonal corners.

Figure 10:
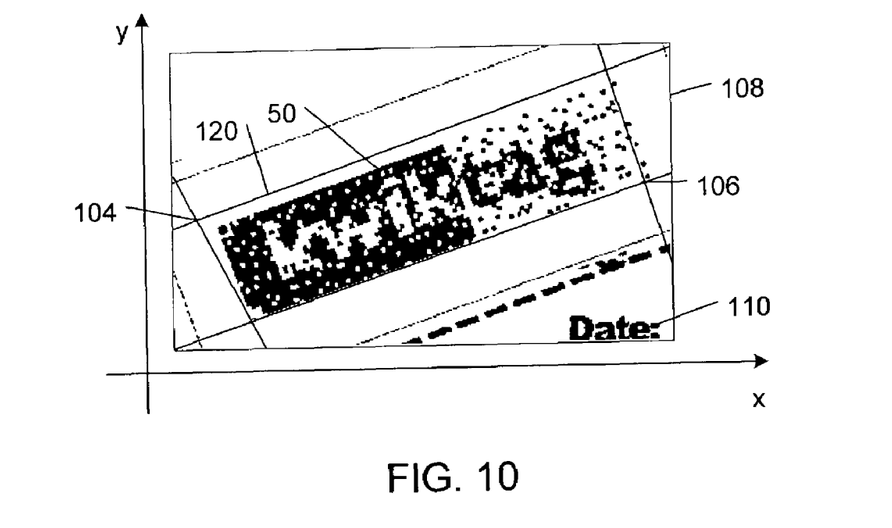
FIG. 10 is a diagrammatic view of an inclusive image region that has been cropped from the composite image of FIG. 3 and encompasses a detected graphical bar code candidate.

Referring back to FIG. 5 and to FIG. 10, after estimates of the corner positions 104, 106 of the first detected graphical bar code candidate have been computed, scanned image 48 may be cropped down in size to an inclusive image region 108 encompassing the detected graphical bar code candidate and, possibly, extraneous markings 110 contained in scanned image 48 (step 112). The size of the inclusive image region 108 may be determined based upon the size of the convolution kernel and the sub-sampling factor to achieve a desired tolerance level. Cropping the size of scanned image 48 down to the size of the inclusive region 108 reduces the amount of computations required for the subsequent processing steps.

Figure 11:
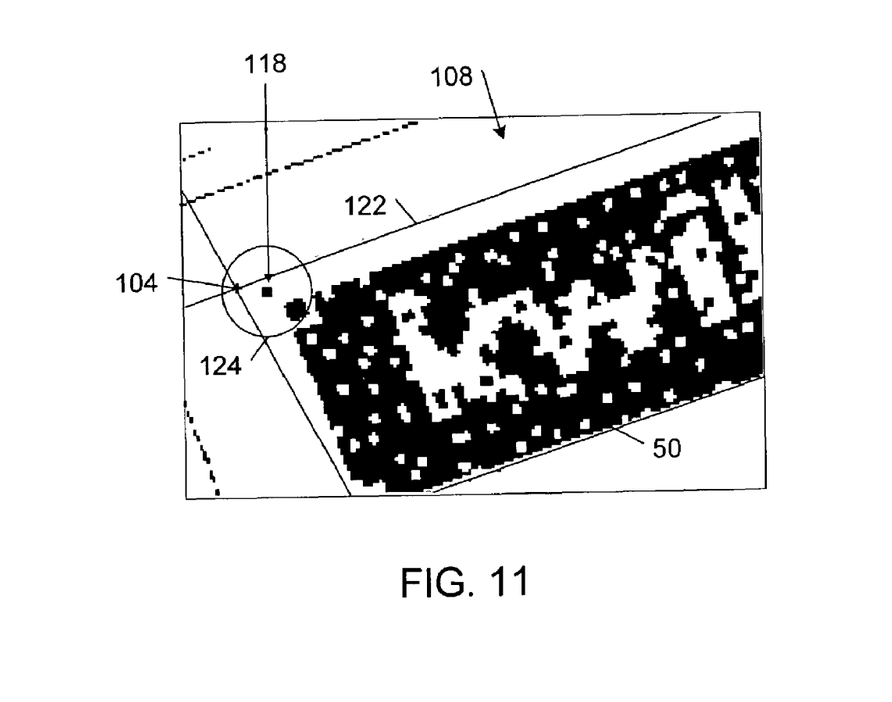
FIG. 11 is an enlarged view of a portion of the inclusive image region of FIG. 10.
Figure 12:
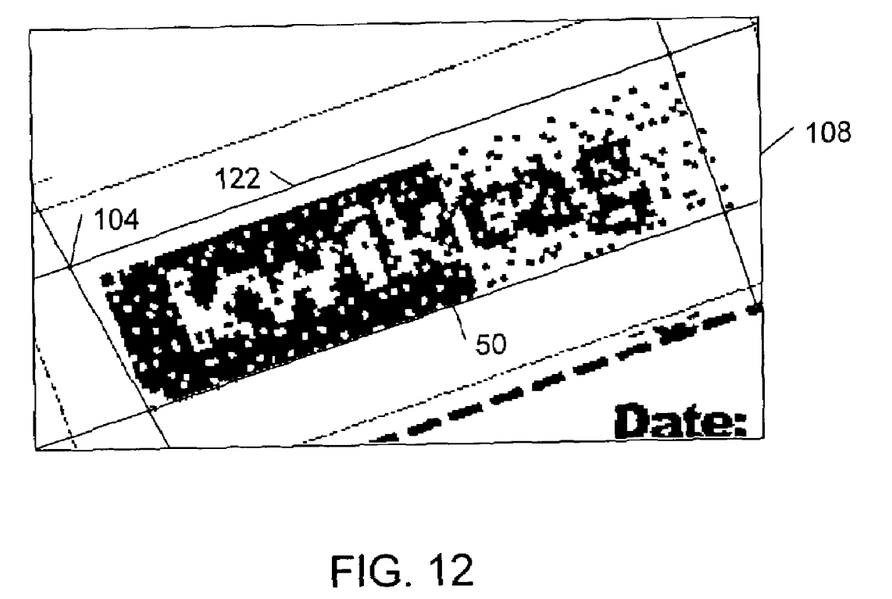
FIG. 12 is a diagrammatic view of the inclusive image region of FIG. 10 with an overlying optimization template in an initial state.

Referring to FIGS. 10 and 11, the estimated corner position coordinate 104 that is reported by graphical bar code extractor 44 (FIG. 4) may not correspond to the true corner location 118. In this regard, an objective function is optimized to obtain final corner position coordinates for the graphical bar code candidate 50 (step 120; FIG. 5). In general, the optimization process involves applying an optimization template 122 at different locations over the inclusive image region 108 and computing a value for an objective function at each location. The optimization template 122 and the objective function are cooperatively designed so that the objective function has its highest or lowest value when the optimization template is positioned at the true corner position and is oriented at the true skew angle. The optimization process terminates when the computed objective function value is either maximized or minimized, depending on how the objective function is defined. The optimization method may be any one of a wide variety of multidimensional optimization methods, including a downhill simplex optimization method, a simulated annealing optimization method, and a steepest descent optimization method.

Figure 13:
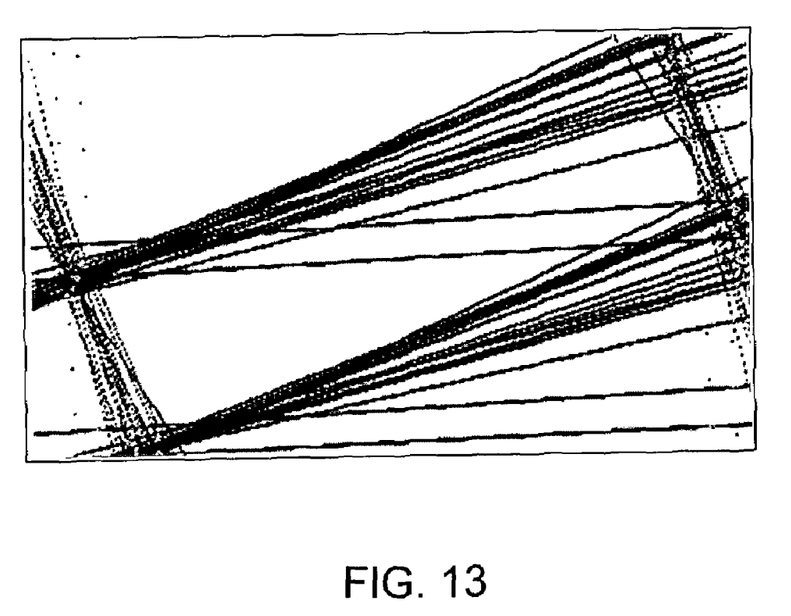
FIG. 13 is a diagrammatic view of the optimization template of FIG. 13 after each of successive steps of an object function optimization process.
Figure 14:
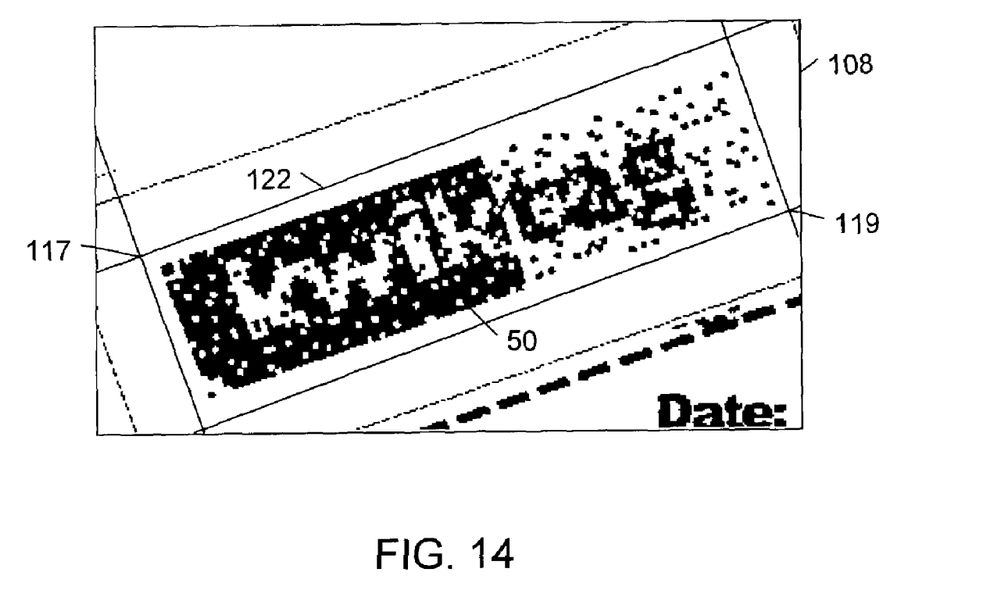
FIG. 14 is a diagrammatic view of the inclusive image region of FIG. 10 with an overlying optimization template in a final state.

Referring to FIGS. 11-14, in the illustrated embodiment, the optimization template 122 is a rectangular boundary region that is sized to contain graphical bar code candidate 50 with corner locations corresponding to the corner locations of graphical bar code candidate 50. The cost function corresponds to a count of white pixels enclosed by optimization template 122. The upper left corner of optimization template 122 initially is positioned at the reported upper left corner position coordinate 104 and is oriented at the skew angle that is computed based on both of the reported corner position coordinates 104, 106. The value of the objective function is computed for the initial state. Next, in one implementation, the upper left corner of template 122 is moved in successive steps within an optimization region 124 (FIG. 11) in accordance with a downhill simplex optimization method that is designed to minimize the objective function. A simplex is an object of N+1 vertices defined in an N dimension space. With a known size, the rectangular boundary region can be uniquely defined by its upper left corner coordinate and a skew angle, i.e., <Row, Column, Angle>. The optimization region 124 has a size that is less than the size of the training kernels (i.e., less than or equal to N×R), and its orientation is within an estimated, maximal angular error. Given the initial estimates of the upper left corner location and the computed skew angle and the estimates of the maximum possible skew angle ($\theta$) and position coordinate error ($\Delta$), the downhill simplex optimization algorithm may optimize the objective function based on the following three-dimensional simplex:

| <Row, | Column, | Angle | > |
|---|---|---|---|
| <Row + $\Delta$, | Column, | Angle | > |
| <Row, | Column + $\Delta$, | Angle | > |
| <Row, | Column, | Angle + $\theta$, | > | where $\Delta$=N×R/2 and $\theta$ is an estimate of a maximum possible skew angle error that may arise based on the computed corner position coordinates 104, 106. The downhill simplex optimization process evolves from the initial state (i.e., the initial left corner location and initial computed skew angle) by performing one or more of the following actions: reflecting away from high; reflecting with expansion away from high; contracting along one dimension from high; and contracting along all dimensions from high. The resulting positions and orientations of optimization template 122 in each of multiple successive steps of the downhill simplex optimization method are shown in FIG. 13. The final optimized position and orientation of template 122, after the downhill simplex optimization process has terminated, is shown in FIG. 14. The corner position coordinates 117, 119 of the optimization template 122 in the final state are used as the final position coordinates for the graphical bar code candidate 50.

Figure 15:
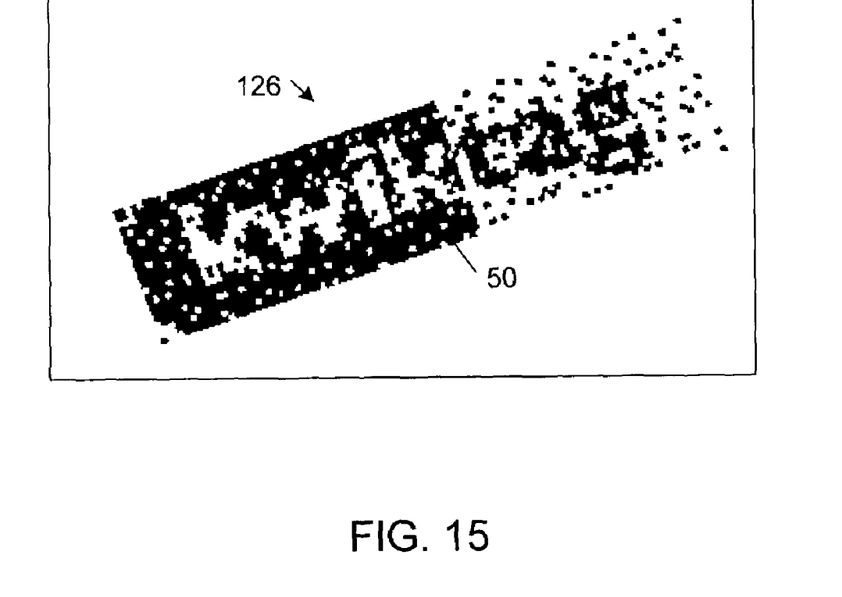
FIG. 15 is a diagrammatic view of the inclusive image region of FIG. 10 after being trimmed based on final position coordinates derived from the final state of the optimization template of FIG. 14.

Referring back to FIG. 5 and to FIG. 15, after the final position coordinates for the graphical bar code candidate 50 has been determined by the objective function optimization method (step 120), the non-graphical bar code regions are trimmed from the inclusive image region based on the final position coordinates for the graphical bar code candidate 50 to produce a trimmed graphical bar code candidate 126 for decoding (step 128).

In some embodiments, the decoding algorithm implemented by decoder 46 may require that the resulting trimmed graphical bar code candidate 126 be de-skewed and have a particular resolution. In these embodiments, the trimmed graphical bar code candidate may be de-skewed (step 130) based on the final position coordinates and scaled (up or down) to the appropriate resolution for decoding (step 132).

The scaled graphical bar code candidate then may be decoded by decoder 46 (step 134). If the graphical bar code candidate is decoded successfully (step 136), the extraction process stops (step 138). If the graphical bar code candidate cannot be decoded successfully (step 136), however, the extraction process is repeated for the next graphical bar code candidate that has been detected in scanned image 48, if any (step 100).

In sum, the above-described embodiments provide a novel approach for automatically extracting graphical bar codes from an input image. In particular, these embodiments enable a graphical bar code to be isolated from a composite image in a way that preserves the information-containing graphical modulations encoding the embedded information and avoid corrupting artifacts, such as markings contained in the composite image. The resulting extracted graphical bar code readily may be processed into a format that is tailored to the requirements of the decoding system, which may be particularly sensitive to noise, such as extraneous markings and image corruption. In addition, these embodiments robustly handle missed and incorrect detections.

The systems and methods described herein are not limited to any particular hardware or software configuration, but rather they may be implemented in any computing or processing environment, including in digital electronic circuitry or in computer hardware, firmware or software. The encoder, document processor, graphical bar code extractor and decoder modules may be implemented, in part, in a computer program product tangibly embodied in a machine-readable storage device for execution by a computer processor. In some embodiments, these modules preferably are implemented in a high level procedural or object oriented programming language; however, the algorithms may be implemented in assembly or machine language, if desired. In any case, the programming language may be a compiled or interpreted language. The encoding, document processing, extracting and decoding methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM.

Any of the foregoing technologies may be supplemented by or incorporated in specially-designed ASICs (application-specific integrated circuits).

Other embodiments are within the scope of the claims.

What is claimed is:

1. A method of extracting from an input image a graphical bar code containing graphically encoded information, comprising:
computing estimates of initial position coordinates for a graphical bar code candidate detected in the input image;
evolving a template from an initial state, through successive states defined by different respective positions and different respective skew angles of the template in relation to the graphical bar code candidate, to a final state in accordance with a process of optimizing an objective function characterizing respedtive regions of the graphical bar code candidate enclosed by the template in respective ones of the states, wherein the initial state is defined by the computed estimates of the initial position coordinates and the final state is defined by final position coordinate estimates for the graphical bar code candidate; and
trimming non-graphical bar code regions from the input image based on the final position coordinate estimates for the graphical bar code candidate to produce a trimmed graphical bar code candidate for decoding.

2. The method of claim 1, wherein the trimming comprises trimming the graphical bar code candidate without any prior de-skewing of the graphical bar code candidate.

3. The method of claim 1, further comprising, before the evolving and the trimming, cropping the input image based on the computed initial position coordinate estimates to obtain a cropped image encompassing the graphical bar code candidate.

4. The method of claim 1, wherein the objective function is a count of white pixels enclosed by the template, and the evolving is performed in accordance with minimizing the objective function.

5. The method of claim 4, wherein the evolving comprises, in each state, positioning the template over the input image in accordance with the corresponding position coordinate estimates defining the state.

6. The method of claim 5, wherein, in each state, the template has a corner positioned at a respective one of the corresponding position coordinate estimates defining the state.

7. The method of claim 4, wherein the evolving is performed in accordance with a downhill simplex optimization method.

8. The method of claim 1, wherein the evolving is performed in accordance with a multidimensional optimization method.

9. The method of claim 8, wherein the evolving is performed in accordance with a multidimensional optimization method selected from: a downhill simplex optimization method; a simulated annealing optimization method; and a steepest descent optimization method.

10. A system for extracting from an input image a graphical bar code containing graphically encoded information, comprising a graphical bar code extractor configured to:
compute estimates of initial position coordinates for a graphical bar code candidate detected in the input image;
evolve a template from an initial state, through successive states defined by different respective positions and different respective skew angles of the template in relation to the graphical bar code candidate, to a final state in accordance with a process of optimizing an objective function characterizing respective regions of the graphical bar code candidate enclosed by the template in respective ones of the states, wherein the initial state is defined by the computed estimates of the initial position coordinates and the final state is defined by final position coordinate estimates for the graphical bar code candidate; and
trim non-graphical bar code regions from the input image based on the final position coordinate estimates for the graphical bar code candidate to produce a trimmed graphical bar code candidate for decoding.

11. The system of claim 10, wherein the graphical bar code extractor is configured to trim the graphical bar code candidate without any prior de-skewing of the graphical bar code candidate.

12. The system of claim 10, wherein the graphical bar code extractor is configured to crop the input image before evolving the template and trimming the non-graphical bar code regions based on the computed initial position coordinate estimates to obtain a cropped image encompassing the graphical bar code candidate.

13. The system of claim 10, wherein the objective function is a count of white pixels enclosed by the template, and the graphical bar code extractor is configured to evolve the template in accordance with minimizing the objective function.

14. The system of claim 13, wherein the graphical bar code extractor is configured to position the template in each state over the input image in accordance with the corresponding position coordinate estimates defining the state.

15. The system of claim 14, wherein, in each state, the template has a corner positioned at a respective one of the corresponding position coordinate estimates defining the state.

16. The system of claim 13, wherein the graphical bar code extractor is configured to evolve the template in accordance with a downhill simplex optimization method.

17. The system of claim 10, wherein the graphical bar code extractor is configured to evolve the template in accordance with a multidimensional optimization method.

18. The system of claim 17, wherein the graphical bar code extractor is configured to evolve the template in accordance with a multidimensional optimization method selected from: a downhill simplex optimization method; a simulated annealing optimization method; and a steepest descent optimization method.

19. A computer program residing on a computer-readable medium and comprising computer-readable instructions for causing a computer to perform operations comprising:
computing estimates of initial position coordinates for a graphical bar code candidate detected in an input image;
evolving a template from an initial state, through successive states defined by different respective positions and different respective skew angles of the template in relation to the graphical bar code candidate, to a final state in accordance with a process of optimizing an objective function characterizing respective regions of the graphical bar code candidate enclosed by the template in respective ones of the states, wherein the initial state is defined by the computed estimates of the initial position coordinates and the final state is defined by final position coordinate estimates for the graphical bar code candidate; and trimming non-graphical bar code regions from the input image based on the final position coordinate estimates for the graphical bar code candidate to produce a trimmed graphical bar code candidate for decoding.

20. The computer program of claim 19, comprising computer-readable instructions for causing a computer to trim the graphical bar code candidate without any prior de-skewing of the graphical bar code candidate.

21. An apparatus, comprising:
a computing module operable to compute estimates of initial position coordinates for a graphical bar code candidate detected in an input image;
a processing module operable to evolve a template from an initial state, through successive states defined by different respective positions and different respective skew angles of the template in relation to the graphical bar code candidate, to a final state in accordance with a process of optimizing an objective function characterizing respective regions of the graphical bar code candidate enclosed by the template in respective ones of the states, wherein the initial state is defined by the computed estimates of the initial position coordinates and the final state is defined by final position coordinate estimates for the graphical bar code candidate; and
an image processing module operable to trim non-graphical bar code regions from the input image based on the final position coordinate estimates for the graphical bar code candidate to produce a trimmed graphical bar code candidate for decoding.

22. The apparatus of claim 21, wherein the image processing module is configured to trim the graphical bar code candidate without any prior de-skewing of the graphic bar code candidate.

23. The apparatus of claim 21, wherein the objective function is a count of white pixels enclosed by the template, and the processing module is configured to evolve the template in accordance with minimizing the objective function.

24. The method of claim 1, wherein the evolving comprises determining a respective corner position and a respective skew angle of the template in relation to the graphical bar code candidate for each of the states of the template.

* * * * *

UNITED STATES PATENT AND TRADEMARK OFFICE
CERTIFICATE OF CORRECTION

| | |
|---|---|
| PATENT NO. | : 7,305,131 B2 |
| APPLICATION NO. | : 10/262434 |
| DATED | : December 4, 2007 |
| INVENTOR(S) | : Jonathan Yen et al. |

Page 1 of 1

It is certified that error appears in the above-identified patent and that said Letters Patent is hereby corrected as shown below:

In column 11, line 17, in Claim 1, delete "respedtive" and insert -- respective --, therefor.

Signed and Sealed this

Fifth Day of August, 2008

JON W. DUDAS
*Director of the United States Patent and Trademark Office*